United States Patent [19]

Tezuka

[11] Patent Number: 4,781,655

[45] Date of Patent: Nov. 1, 1988

[54] SYSTEM FOR CONTROLLING THE PRESSURE OF OIL IN A SYSTEM FOR A CONTINUOUSLY VARIABLE TRANSMISSION

[75] Inventor: Kazunari Tezuka, Asaka, Japan

[73] Assignee: Fuji Jukogyo Kabushiki Kaisha, Tokyo, Japan

[21] Appl. No.: 31,986

[22] Filed: Mar. 27, 1987

[30] Foreign Application Priority Data

Mar. 13, 1986 [JP] Japan .................................. 61-73690

[51] Int. Cl.$^4$ ...................... F16H 11/02; B60K 41/12
[52] U.S. Cl. ......................................... 474/28; 74/866; 74/868; 364/424.1; 474/12
[58] Field of Search ............................ 474/28, 18, 12; 74/865–869; 364/424.1

[56] References Cited

U.S. PATENT DOCUMENTS 4,663,991  5/1987  Nakamura et al. ............... 474/28 X
4,672,864  6/1987  Morimoto ......................... 474/28 X

FOREIGN PATENT DOCUMENTS 0205257 12/1986 European Pat. Off. .

Primary Examiner—Thuy M. Bui
Attorney, Agent, or Firm—Martin A. Farber

[57] ABSTRACT

A control system for a continuously variable transmission has a line pressure control valve having ports and a spool for controlling the line pressure of oil supplied to a cylinder of a driven pulley. The pressure of the oil supplied to control the spool is controlled by an on-off control valve in accordance with engine operating conditions to control the line pressure. The duty ratio of pulses for operating the on-off control valve is obtained by positioning a desired line pressure between the lowest line pressure and the highest line pressure corresponding to duty ratios of 100% and 0%, respectively.

12 Claims, 7 Drawing Sheets

SYSTEM FOR CONTROLLING THE PRESSURE OF OIL IN A SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the line pressure in a hydraulic circuit for the transmission.

A known control system for a continuously variable belt-drive transmission disclosed in EP-A-No. 205 257 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a line pressure control valve and a transmission ratio control valve. Each valve comprises a spool to control the oil supplied to the servo devices.

The transmission ratio control valve operates to control the transmission ratio to a desired transmission ratio which is determined in accordance with the opening degree of a throttle valve of an engine and the speed of the engine. The line pressure control valve is adapted to control the line pressure to a necessary line pressure which is determined in accordance with the transmission ratio and the engine torque. The output of the engine is transmitted to the drive pulley through a clutch. The line pressure is controlled to prevent the belt from slipping on the pulleys in order to transmit the output of the engine.

At the start of the vehicle, the transmission ratio is set at a maximum value. When the vehicle speed and engine speed reach set values under a driving condition, the transmission ratio starts to change (upshift). At that time, if the engine speed is kept constant, the transmission ratio is automatically and continuously reduced at a speed which is determined by the line pressure, the pressure of oil supplied to the servo device of the drive pulley, and the actual transmission ratio.

In such a system, it is preferable to shift the spool of the line pressure control valve by control oil supplied to an end of the spool and to control the line pressure by controlling the amount of the control oil. The control of the amount of the control oil is carried out by controlling the drain of the control oil by a solenoid operated valve which is intermittently operated by pulses. Thus, by controlling the duty ratio of the pulses, the line pressure is controlled to a necessary value.

However, if the duty ratio of the pulses does not properly correspond to the desired ratio, the line pressure can not be precisely and quickly controlled to the necessary value.

SUMMARY OF THE INVENTION

The object of the present invention is to provide a system in which the duty ratio is set to a proper value thereby exactly and quickly controlling the line pressure to a necessary line pressure.

According to the present invention, there is provided a control system for a continuously variable transmission for transmitting the power of an internal combustion engine, the system comprisig a drive pulley having a hydraulically shiftable disc and a first hydraulic cylinder for shifting the disc, a driven pulley having a hydraulically shiftable disc and a second hydraulic cylinder for operating the disc of the driven pulley, a belt engaged with both pulleys, a line pressure control valve having ports and a spool, a transmission ratio control valve having ports and a spool, a first hydraulic circuit having a pump for supplying oil to the first cylinder through the line pressure control valve and transmission ratio control valve. The system comprises first means for shifting the spool of the line pressure control valve in accordance with a control signal so as to control the line pressure, second means for producing an engine speed signal, an actual transmission ratio signal, and a desired line pressure signal, in accordance with operating conditions of the transmission and the engine, a first three-dimensional table for producing a high line pressure signal, which is obtained by one extreme control signal, dependent on the engine speed signal and the actual transmission ratio signal, a second three-dimensional table for producing a low line pressure signal, which is obtained by another extreme control signal, dependent on the engine speed signal and the actual transmission signal, third means responsive to the desired line pressure signal for producing a corrected control signal with respect to both the extreme control signals, said first means responsive to the corrected control signal for correcting the line pressure.

In an aspect of the invention, the first means comprises a second hydraulic circuit for supplying oil to the line pressure control valve so as to shift the spool thereof and control valve means provided in the second hydraulic circuit for controlling the amount of oil supplied to the line pressure control valve, and the control valve means is a solenoid operated on-off valve, and the control signal is pulses for operating the on-off valve, the duty ratio of which is changed so as to control the line pressure.

The other objects and features of this invention will become understood from the following description with reference to the accompanying drawings.

DETAILED DESCRIPTION OF THE PREFERRED EMBODIMENT

Figure 1:
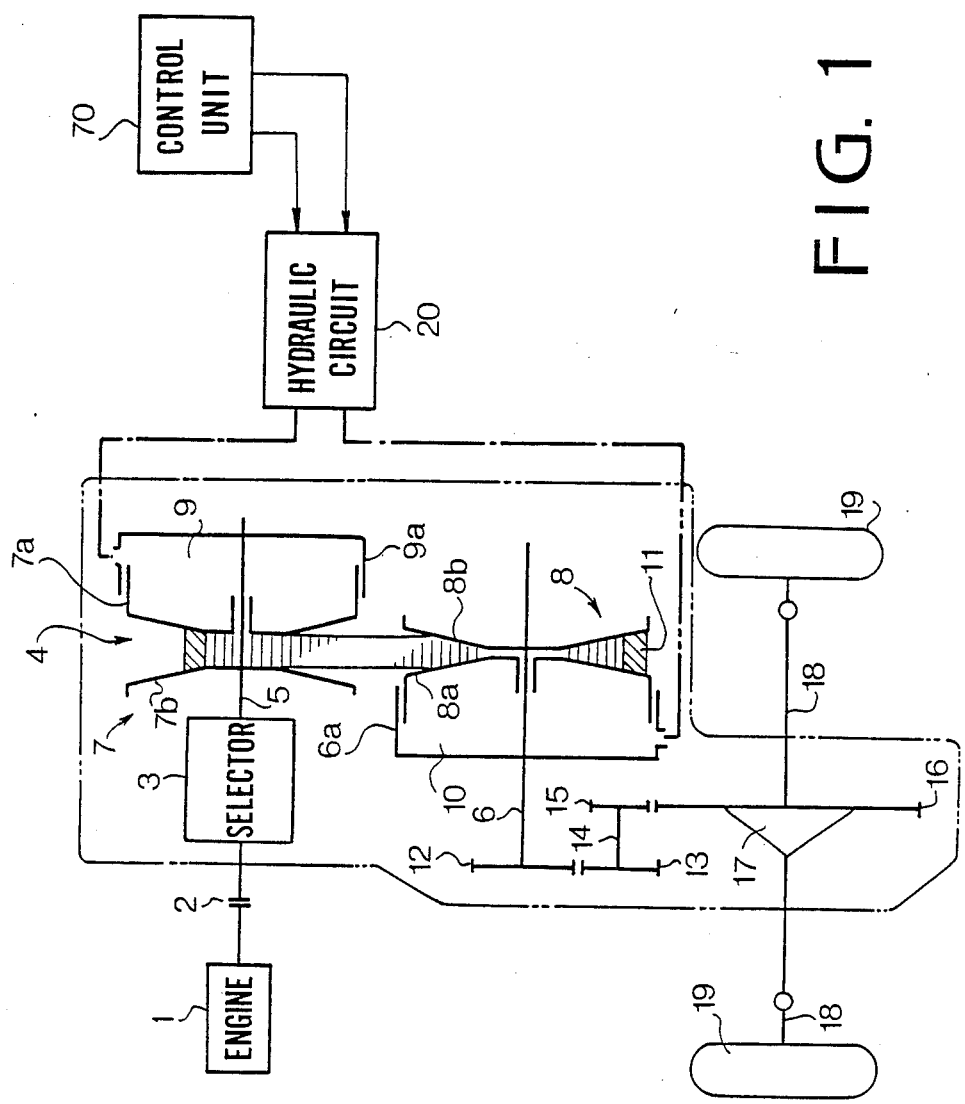
FIG. 1 is a schematic illustration of a continuously variable belt-drive transmission.

Referring to FIG. 1, the continuously variable belt-drive automatic transmission for a motor vehicle to which the present invention is applied, comprises an electromagnetic powder clutch 2 for transmitting the power of an engine 1 to transmission 4 through a selector mechanism 3.

The belt-drive transmission has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft opposite the movable conical disc 8c. The conical disc 8a has a cylindrical portion which is slidably engaged in a cylinder 6a of the output shaft 6 to form a servo device. A chamber 10 of the servo device is also communicated with the hydraulic control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of the vehicle driving wheels 19 through a differential 17.

Figure 2A:
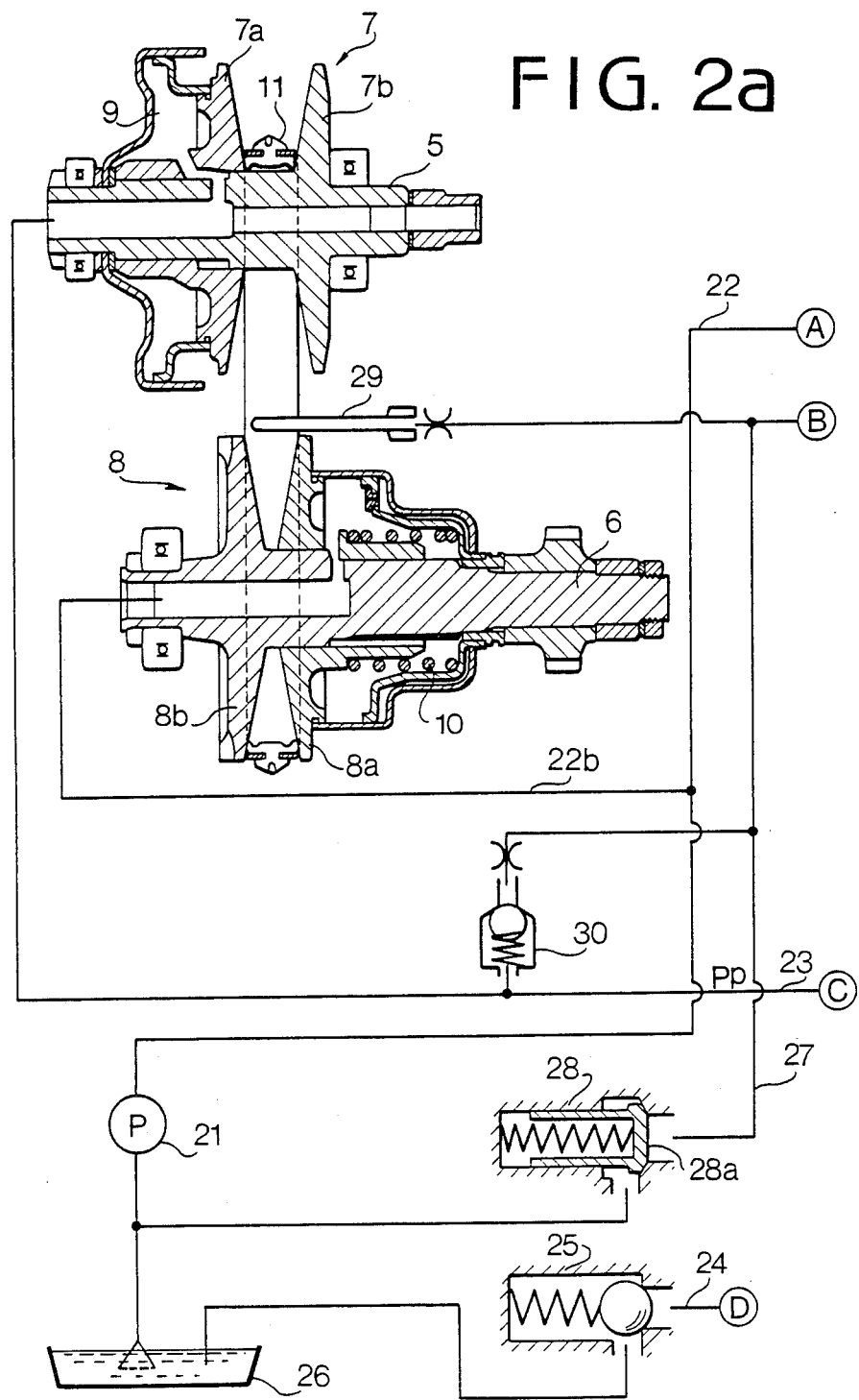
FIGS. 2a to 2c are schematic diagrams showing a control system according to the present invention.
Figure 2B:
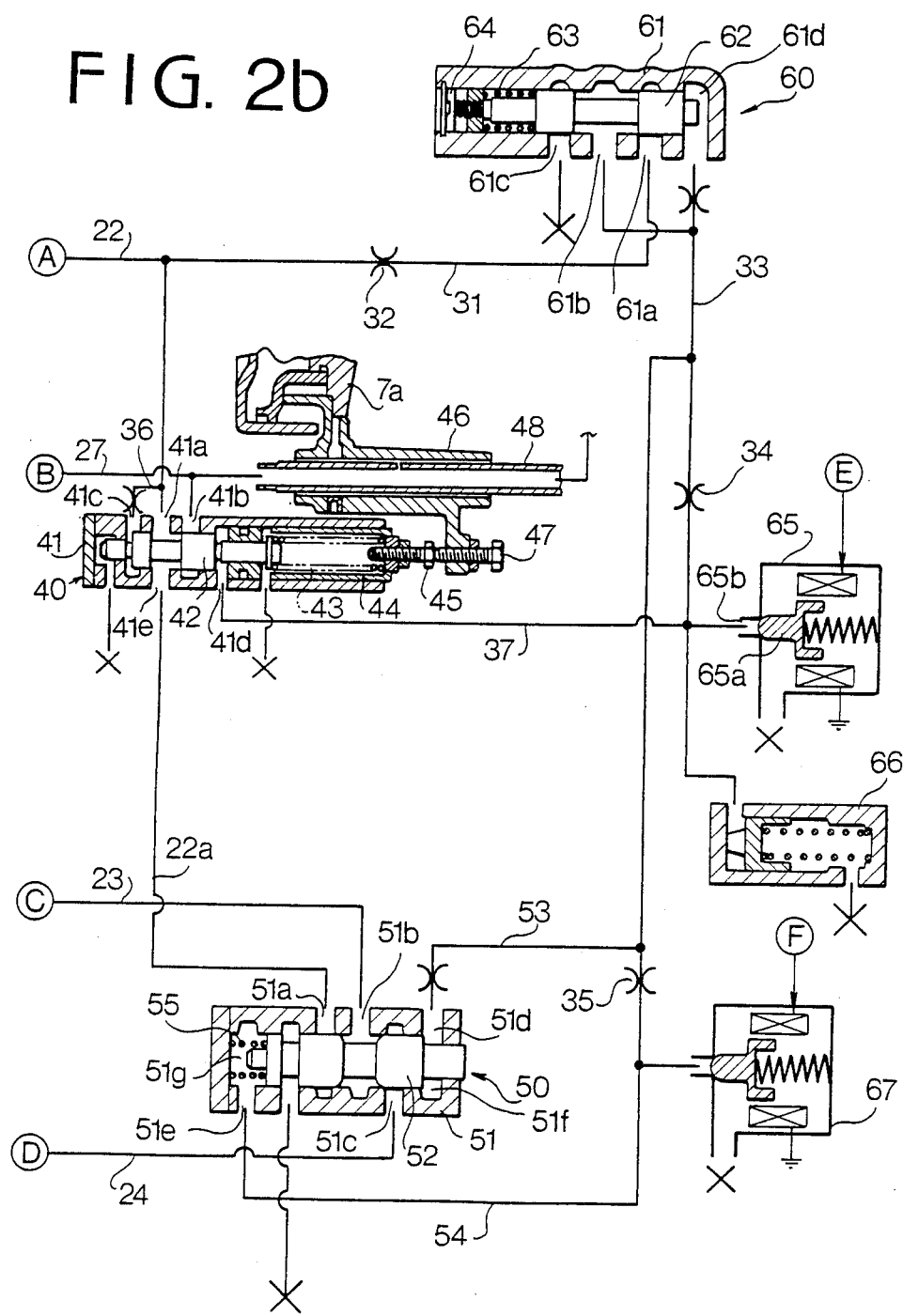
Figure 2C:
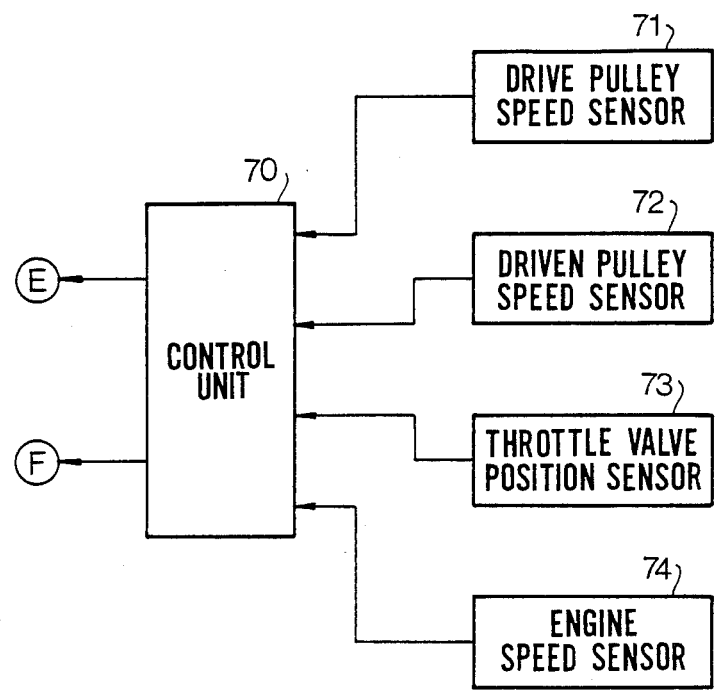

Referring to FIGS. 2a to 2c, the hydraulic control circuit 20 of FIG. 1 includes an oil pump 21 driven by the engine 1, a line pressure control valve 40 and a transmission ratio control valve 50. The line pressure control valve 40 comprises a valve body 41, spool 42, and ports 41a, 41b, 41c, 41d, 41e. The chamber 9 of the drive pulley 7 is applied with pressurized oil by the oil pump 21 from an oil reservoir 26 passing through a line pressure conduit 22, ports 41a and 41e of the line pressure control valve 40, transmission ratio control valve 50, and conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8.

The line pressure control valve 40 has an axially slidable spring retainer 44, a spring 43 provided between the spool 42 and the retainer 44, and an adjust screw 45 screwed in the spring retainer 44. The screw 45 engages with a screw 47 screwed in a transmission ratio sensing shoe 46 which is slidably mounted on a lubricating oil tube 48. The sensing shoe 46 is slidably engaged with either of the movable conical discs 7a and 8a (disc 7a in the embodiment), so that the axial movement of the disc 7a is transmitted to the spool 42 through sensing shoe 46, screws 47, 45, spring retainer 44 and spring 43. The spool 42 is applied with pressurized oil supplied to a chamber communicating with port 41c through a conduit 36. The spool 42 is urged to the left by the force of spring 43. The port 41a is communicated with port 41b of a drain passage 27 in accordance with the position of a land of the spool 42.

The transmission ratio control valve 50 comprises a valve body 51, spool 52, and a spring 55 for urging the spool in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with line pressure control valve 40 through conduit 22a. The drain port 51c is communicated with the oil reservoir 26 through a conduit 24 and check valve 25. The drain port 41b of the line pressure control valve 40 communicates with oil reservoir 26 through passage 27 and a lubricating oil pressure providing valve 28 in the form of a check valve 28a. The passage 27 is further communicated with conduit 23 through a check valve 30. A part of the oil in the passage 27 is supplied to the pulley 8 from a nozzle 29 passing through the tube 48 to lubricate the pulley device.

The system is provided with a pressure reducing valve or pressure control valve 60, and solenoid operated on-off control valves 65 and 67. The pressure control valve 60 comprises a valve body 61, spool 62, ports 61a, 61b and 61c, end chamber 61d, and spring 63 urging the spool 62 to the chamber 61d. The load of the spring 63 can be adjusted by a screw 64. The port 61a is connected to the conduit 22 by a conduit 31 having an orifice 32, and port 61b and chamber 61d are connected to a conduit 33. When the pressure in the conduit 33 reduces, the spool 62 is shifted to the right by spring 63, so that port 61a communicates with port 61b to increase the pressure in the conduit 33. Thus, a constant pressure of oil is provided in the conduit 33.

The conduit 33 is communicated with the port 41d of the line pressure control valve 40 through an orifice 34 and a passage 37. The conduit 33 is also communicated with the reservoir 26 through the solenoid operated on-off valve 65 and with an accumulator 66. Further, the conduit 33 is communicated with an end chamber 51f of the port 51d of the transmission ratio control valve 50 through a passage 53 and with another end chamber 51g of the port 51e through a passage 54 having an orifice 35. The solenoid operated on-off valve 67 is connected to the passage 54 downstream of orifice 35 so as to drain the oil to the resrvoir 26. The solenoid operated valve 65 is adapted to be operated by pulses. When energized, a valve 65a opens a drain port 65b. The solenoid operated valve 67 is the same as valve 65 in construction and operation. The control valves 65 and 67 are operated by pulses from a control unit 70. Thus, control pressures applied to ports 41d, 51e are changed by changing duty ratios of pulses (control signal) supplied to the control valves 65 and 67. When the duty ratio for the valve 65 is at 100%, the pressure at port 41d becomes minimum to shift the spool 42 to the right to open the drain port 41b. Thus, the line pressure becomes the lowest value.

In the line pressure control valve 40, the relationship among spring load $F_S$ and line pressure $P_L$ (at port 41e), line pressure receiving area $S_L$ of the spool, control pressure $P_d$ at the port 41d, and control pressure receiving area $S_d$ is as follows:

$$F_S + P_d S_d + P_L S_L$$

$$P_L = (P_d S_d + F_s)/S_L$$

Accordingly, the line pressure $P_L$ is proportional to the control pressure $P_d$.

The relationship between the duty ratio (D) of pulses applied to the solenoid operated control valve 67 and the transmission ratio (i) is explained hereinafter.

The transmission ratio changing speed (di/dt) is a function of flow rate Q of oil supplied to the chamber 9, and the flow rate Q is a function of the duty ratio D, line pressure PL and primary pressure $P_p$ in the chamber 9, namely:

$$di/di = F(Q) = F(D, P_L, P_p)$$

The line pressure $P_L$ is determined by the transmission ratio i and engine torque, and the primary pressure $P_p$ in the chamber 9 is determined by the transmission ratio i and the line pressure $P_L$. Accordingly, assuming the engine torque to be constant, $$di/dt = f(D, i)$$

$$D = f(di/dt, i)$$

Accordingly, the duty ratio is determined by the transmission ratio changing speed $di/dt$ and the transmission ratio i. On the other hand, the transmission ratio changing speed $di/dt$ is dependent on the difference between the actual transmission ratio i and a desired transmission ratio id, $$di/dt = K(id - i)$$

where k is a coefficient.

Accordingly, if the transmission ratio changing speed $di/dt$ is determined, the duty ratio D can be obtained from the speed. When the actual transmission ratio i is larger than the desired transmission ratio id (i>id), the valve of $di/dt$ is negative. In such a state, the duty ratio D is increased to reduce the pressure in the chamber 51g so as to upshift the transmission. The downshift is performed in the reverse manner.

Figure 3:
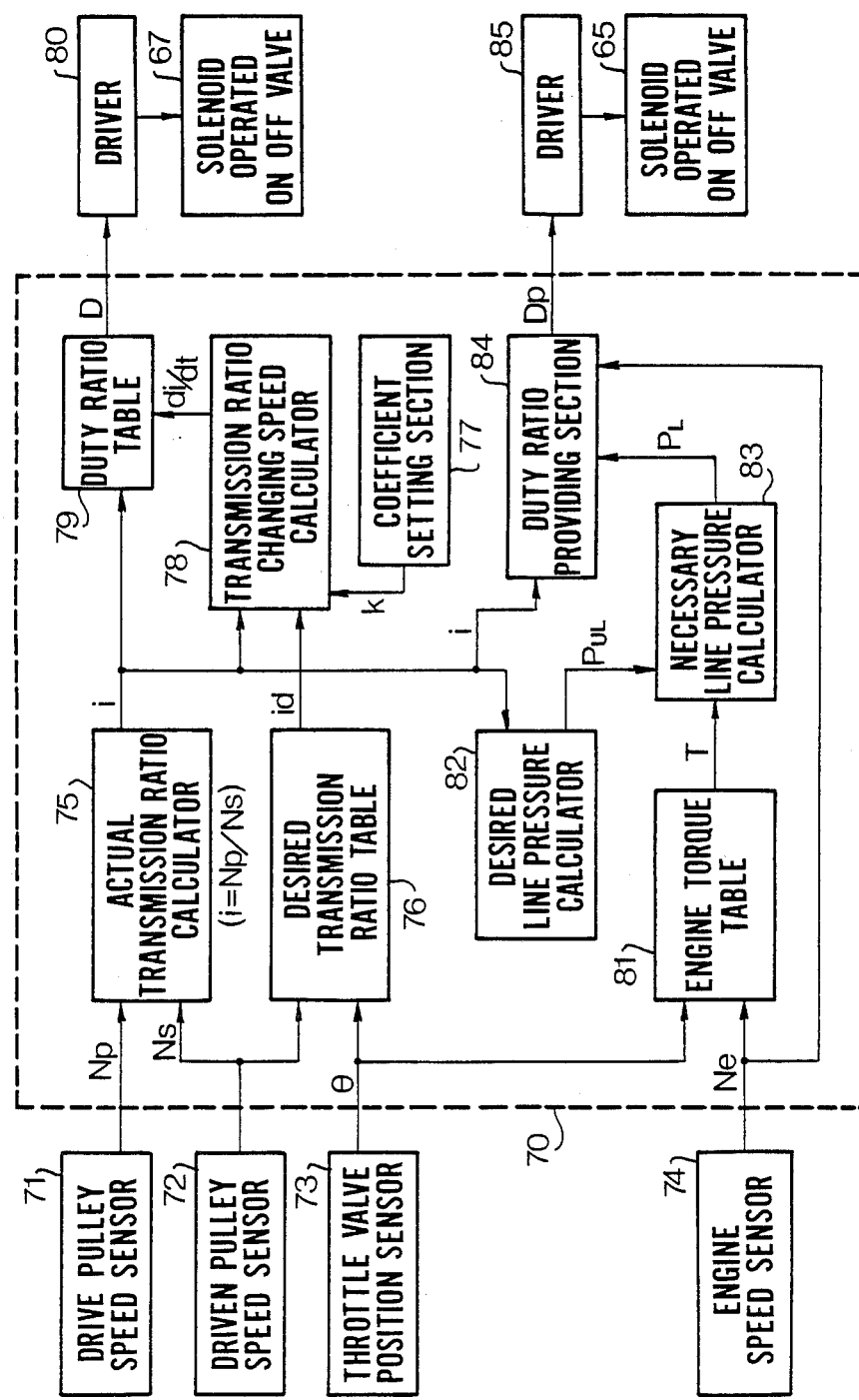
FIG. 3 is a block diagram of a control system.

Referring to FIG. 3, the system is provided with a drive pulley speed sensor 71, driven pulley speed sensor 72, throttle valve position sensor 73, and engine speed sensor 74. Output signals $N_P$ and $N_S$ of sensor 71 and 72 are fed to an actual transmission ratio calculator 75 in the control unit 70 to produce an actual transmission ratio i in accordance with $i = N_P / N_S$. The output signals $N_S$ of the sensor 72 and the output signal $\theta$ of the throttle valve position sensor 73 are fed to a desired transmission ratio table 76. The desired transmission ratio id is fetched from the table in accordance with the signals $N_S$ and $\theta$. The actual ratio i, desired ratio id and coefficient K from a coefficient setting section 77 are applied to a transmission ratio changing speed calculator 78 to produce a transmission ratio changing speed $di/dt$ from the formula $di/dt = K(id - i)$.

The speed $di/dt$ and actual ratio i are applied to a duty ratio table 79 to derive the duty ratio D of pulses for control valve 67 as a control signal. The duty ratio in the table 79 decreases with increases of speed $di/dt$ and ratio i. The duty ratio D is supplied to the solenoid operated valve 67 through a driver 80.

On the other hand, an output signal Ne of the engine speed sensor 74 and throttle position signal $\theta$ are fed to an engine torque table 81 to derive engine torque T. On the other hand, the actual transmission ratio i is applied to a desired line pressure calculator 82 which produces a desired line pressure $P_{UL}$ from a graph. The desired line pressure $P_{UL}$ and engine torque T are fed to a necessary line pressure calculator 83 to produce necessary line pressure $P_L$ dependent on $P_L = P_{UL} \times T$.

In the system of the present invention, engine speed Ne, actual transmission ratio i and necessary line pressure $P_L$ are applied to a duty ratio providing section 84 to produce a duty ratio Dp as a control signal as hereinafter described in detail. The duty ratio $D_P$ is applied to the solenoid operated valve 65 through a driver 85.

Figure 4A:
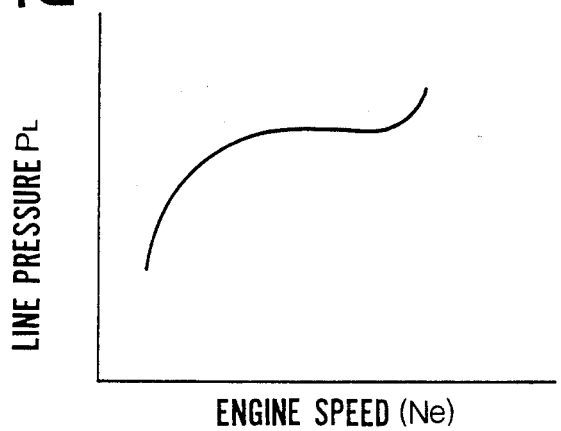
FIG. 4a to 4c are graphs showing line pressure characteristics.

Since the pump 21 is driven by the engine 1, the discharge quantity of the pump is a function of engine speed excepting other factors such as temperature of oil. Accordingly, the line pressure $P_L$ is dependent on the engine speed as shown in FIG. 4a if the transmission ratio i is constant.

Figure 4B:
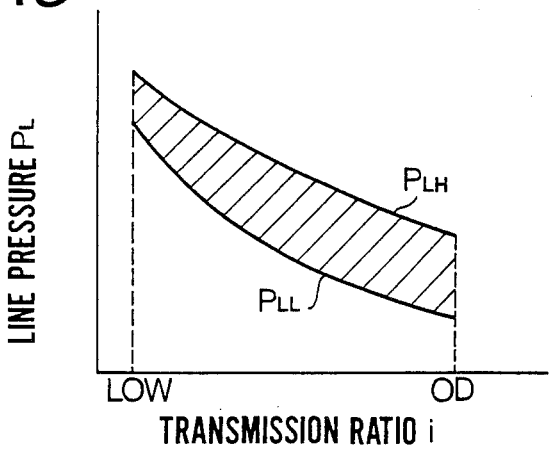
Figure 5A:
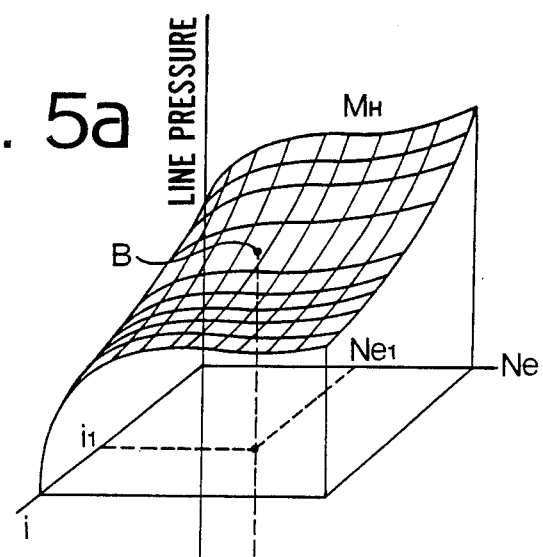
FIGS. 5a and 5b show three-dimensional tables for line pressure.

Further, the line pressure is controlled by the line pressure control valve 40 through the sensor shoe 46 in accordance with the transmission ratio i. Therefore, the line pressure $P_L$ changes between the highest pressure $P_{LH}$ and the lowest pressure $P_{LL}$, with transmission ratio i as shown in FIG. 4b. Accordingly, the highest and lowest line pressures can be obtained in accordance with line pressure $P_L$ and transmission ratio i, respectively. FIG. 5a shows a three-dimensional table $M_H$ for the highest line pressure and FIG. 5b shows a three-dimensional table $M_L$ for the lowest line pressure.

Figure 4C:
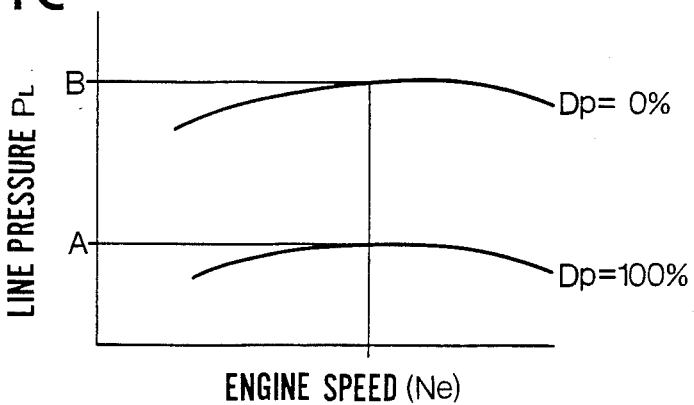

As described above and shown in FIG. 4c, when the duty ratio is at 100%, the line pressure becomes the lowest value. Accordingly, the table $M_L$ is for the duty ratio of 100%. Similarly, the table $M_H$ is for the duty ratio of 0%. By using the tables, a duty ratio corresponding to a a corrected necessary line pressure can be obtained.

Figure 5B:
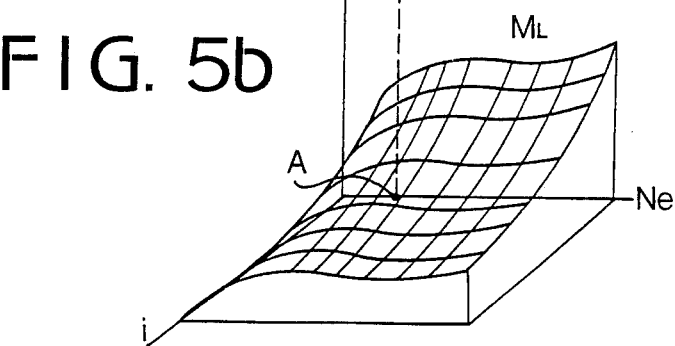
Figure 5C:
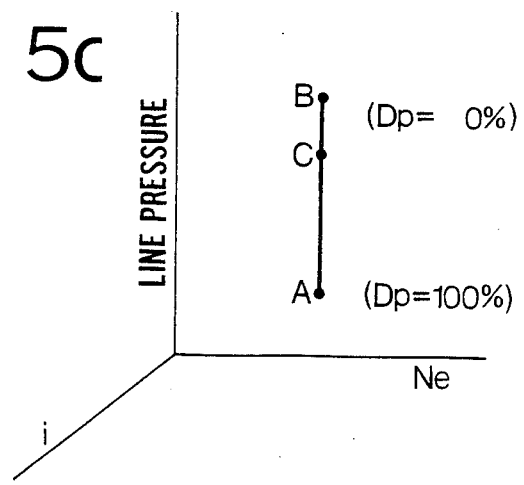
FIG. 5c is a graph for explaining the calculation for duty ratio.

More particularly, assuming the engine speed to be $Ne_1$ and the transmission $i_1$ at a certain time, the highest and lowest line pressures at the time are obtained from the tables as B and A as shown in FIGS. 5a and 5b. The necessary line pressure C ($P_L$ calculated in necessary line pressure calculator 83, FIG. 3) at the time can be positioned between A and B as shown in FIG. 5c. Since the line pressure B is obtained by duty ratio 0% and A corresponds to duty ratio 100%, the necessary duty ratio $D_1$ for the necessary line pressure is obtained by the following equation.

$$D_1 = (B - C)/(B - A)\%$$

The control valve 65 is operated at the duty ratio D1.

In operation, while the vehicle is at a stop, chamber 10 of the driven pulley is supplied with line pressure through passage 22b, and the chamber 9 of the drive pulley is drained, since the signals $N_P$, $N_S$, $\theta$ and the duty ratio are zero, so that the spool 52 is at the right end position and the drain port 51c communicates with the chamber 9 through the conduit 23. Thus, in the pulley and belt drive of the continuously variable belt-drive transmission, the driving belt 11 engages with the driven pulley 8 at a maximum running diameter to provide the maximum transmission ratio (low speed stage). When the accelerator pedal is depressed, the electromagnetic clutch 2 is gradually engaged, transmitting the engine power to the drive pulley 7. The power of the engine is transmitted to the output shaft 6 at the maximum transmission ratio by the driving belt 11 and driven pulley 8, and further transmitted to the axles of the driving wheels 19. Thus, the vehicle is started.

At that time the line pressure is at the highest value by the pressure control valve 40, since the duty ratio D for the valve 65 is at zero percent, and the spool 42 of the control valve 40 is at the left end position. When the throttle valve is opened for acceleration, the desired transmission ratio id and transmission ratio changing speed $di/dt$ are calculated by calculators 76, 78, and the duty ratio D is obtained from the table 79. The value of the duty ratio D is larger than the neutral value, so that the pressure in the chamber 51f of the control valve 50 is higher than the chamber 51g. Thus, the spool 52 is shifted to the left to communicate the port 51a with port 51b, so that oil is supplied to the chamber 9 through the conduit 23. On the other hand, the duty ratio DP for the control valve 65 is increased, so that the pressure in the port 41d becomes low to shift the spool 42 of the valve 40 to the right. Accordingly, the port 41a communicates with the port 41b of the drain passage 27. Thus, line pressure reduces, and the transmission is upshifted, since oil is still supplied to the chamber 9 through the control valve 50. As the difference between the desired ratio id and actual ratio i becomes large, the duty ratio D for the control valve 67 becomes large, thereby increasing the transmission changing speed di/dt. When the opening degree of the throttle valve is reduced for deceleration, the duty ratio D is reduced, thereby shifting the spool 52 to the right to drain the chamber 9. Thus, the transmission is downshifted. The transmission changing speed at downshifting increases with reducing of the duty ratio. As the transmission is downshifted, the sensor shoe moves to the left to increase the force of spring 43. Accordingly, line pressure increases.

As described above, the duty ratio $D_P$ for the control valve 65 is obtained from duty ratio providing section 84 (FIG. 3) from the tables $M_L$ and $M_H$ and the necessary line pressure $P_L$. When engine speed Ne decreases, the value of (B−C) of FIG. 5c decreases to reduce the duty ratio $D_P$. As the transmission ratio i becomes small, the value of (B−A) reduces to increase the duty ratio $D_P$. Thus, the duty ratio for a necessary line pressure $P_L$ (FIG. 3) obtained in accordance with transmission raito i and engine torque T is corrected by the engine speed and transmission ratio.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for a continuously variable transmission for transmitting the power of an internal combustion engine, the transmission comprising a drive pulley including a hydraulically shiftable disc and a first hydraulic cylinder for shifting the disc, a driven pulley having a hydraulically shiftable disc and a second hydraulic cylinder for shifting the disc of the driven pulley, and a belt engaged with both pulleys, the control system including a line pressure control valve providing line pressure and having ports and a spool, a transmission ratio control valve having ports and a spool, and a first hydraulic circuit having a pump for supplying oil to the first hydraulic cylinder through the line pressure control valve and transmission ratio control valve, the latter controlling the transmission ratio of the transmission by controlling the amount of the oil supplied to the first hydraulic cylinder, the improvement in the control system comprising:

a second hydraulic circuit for supplying control oil to the line pressure control valve for shifting the spool of the line pressure control valve;

a solenoid operated control valve controllable by control pulses and provided in the second hydraulic circuit for controlling amount of the control oil supplied to the line pressure control valve so as to shift the spool of the line pressure control valve dependent thereon;

an engine speed sensor for producing an engine speed signal corresponding to engine speed;

a drive pulley speed sensor for producing a drive pulley speed signal corresponding to speed of the drive pulley;

a driven pulley speed sensor for producing a driven pulley speed signal corresponding to speed of the driven pulley;

a first calculator for producing an actual transmission ratio signal in accordance with said drive and driven pulley speed signals;

a second calculator for determining a necessary line pressure in accordance with operating conditions of the engine and said actual transmission ratio signal; and first means including:

a first three-dimensional table storing values, representing high line pressures obtained by a minimum duty ratio of said control pulses, as a function of engine speed and actual transmission ratio; and a second three-dimensional table storing values, representing low line pressures obtained by a maximum duty ratio of said control pulses, as a function of engine speed and actual transmission ratio;

said first means for determining a value of a high line pressure and a value of a low line pressure from said first and second tables, respectively, in accordance with said actual transmission ratio signal and said engine speed signal;

said first means being further responsive to said necessary line pressure and said determined values of said high and low line pressures for producing in accordance with said necessary line pressure and said determined values of said high and low line pressures a necessary duty ratio of said control pulses for operating said solenoid operated control valve to control the line pressure to a corrected necessary line pressure.

2. A system according to claim 1, wherein:
said maximum and minimum duty ratios are 100% and 0% respectively.

3. A system according to claim 1, wherein:
said necessary duty ratio is produced by calculating the ratio in percent of the difference of said necessary line pressure from one of said determined values of high and low line pressures to the difference between said determined values of high and low line pressures.

4. A system according to claim 1, wherein:
said first hydraulic circuit further communicates said line pressure with said second hydraulic cylinder.

5. A system according to claim 1, further comprising:
pressure regulator valve means in said second hydraulic circuit for controlling said control oil to be at a constant pressure for control by said solenoid operated control valve.

6. A system according to claim 1, wherein said second calculator comprises:
desired line pressure means for determining a desired line pressure from the actual transmission ratio signal, and necessary line pressure calculator means for calculating said necessary line pressure from said desired line pressure and engine torque, the latter being derived from the engine speed signal and a desired load.

7. A system according to claim 1, wherein:
said pump is driven by the engine.

8. A system according to claim 1, further comprising:
mechanical sensor means for mechanically detecting the actual transmission ratio of the transmission and for shfting the spool of said line pressure control valve dependent thereon.

9. A system according to claim 8, wherein:
said mechanical sensor means is a shoe connected to said shiftable disc of said drive pulley.

10. A system according to claim 9, wherein:
said line pressure control valve includes a spring biasing said spool of said line pressure control valve, said shoe acts on said spring.

11. A system according to claim 10, wherein:
at least one of said shoe and said spring are adjustable relative to each other.

12. In a control system for a continuously variable transmission for transmitting the power of an internal combustion engine, the transmission comprising a drive pulley including a hydraulically shiftable disc and a first hydraulic cylinder for shifting the disc, a driven pulley having a hydraulically shiftable disc and a second hydraulic cylinder for shifting the disc of the driven pulley, and a belt engaged with both pulleys, the control system including a line pressure control valve providing line pressure and having ports and a spool, a transmission ratio control valve having ports and a spool, and a first hydraulic circuit having a pump for supplying oil to the first hydraulic cylinder through the line pressure control valve and transmission ratio control valve, the latter controlling the transmission ratio of the transmission by controlling the amount of the oil supplied to the first hydraulic cylinder, the improvement in the control system comprising:

a second hydraulic circuit for supplying control oil to the line pressure control valve for shifting the spool of the line pressure control valve;

a solenoid operated control valve controllable by control pulses and provided in the second hydraulic circuit for controlling amount of the control oil supplied to the line pressure control valve so as to shift the spool of the line pressure control valve dependent thereon;

an engine speed sensor for producing an engine speed signal corresponding to engine speed;

a drive pulley speed sensor for producing a drive pulley speed signal corresponding to speed of the drive pulley;

a driven pulley speed sensor for producing a driven pulley speed signal corresponding to speed of the driven pulley;

a first calculator for producing an actual transmission ratio signal in accordance with said drive and driven pulley speed signals;

a second calculator for determining a necessary line pressure in accordance with operating conditions of the engine and said actual transmission ratio signal; and first means including:

three-dimensional tables storing values, representing line pressures obtained by a predetermined duty ratio of said control pulses, as a function of engine speed and actual transmission ratio; and said first means for determining a value of said line pressures from said table in accordance with said actual transmission ratio signal and said engine speed signal;

said first means being further responsive to said necessary line pressure and said value of said line pressures for producing in accordance with said necessary line pressure and said value of said line pressures a necessary duty ratio of said control pulses for operating said solenoid operated control valve to control the line pressure to a corrected necessary line pressure.

* * * * *